US010559950B2

(12) United States Patent
Kellerman (10) Patent No.: US 10,559,950 B2
(45) Date of Patent: Feb. 11, 2020

(54) CROSSOVER-BRIDGE CABLE ROUTER (71) Applicant: CABLOFIL INC., Mascoutah, IL (US)

(72) Inventor: Dallas Kellerman, Belleville, IL (US)

(73) Assignee: CABLOFIL INC., Mascoutah, IL (US)

( * ) Notice: Subject to any disclaimer, the term of this patent is extended or adjusted under 35 U.S.C. 154(b) by 0 days.

(21) Appl. No.: 14/969,458

(22) Filed: Dec. 15, 2015

(65) Prior Publication Data
US 2016/0181778 A1 Jun. 23, 2016

Related U.S. Application Data (60) Provisional application No. 62/096,250, filed on Dec. 23, 2014.

(51) Int. Cl.
H02G 3/38 (2006.01)

(52) U.S. Cl.
CPC .................................. H02G 3/385 (2013.01)

(58) Field of Classification Search
CPC ......... H02G 3/385; H02G 3/0418; H02G 7/16
See application file for complete search history.

(56) References Cited

U.S. PATENT DOCUMENTS

| 2,656,998 | A | * | 10/1953 | Ullberg, Jr. | .......... | H02G 3/0443 |
| | | | | | | 193/41 |
| 5,937,131 | A | | 8/1999 | Haataja et al. | | |
| 6,037,543 | A | | 3/2000 | Nicoli et al. | | |
| 6,284,975 | B1 | * | 9/2001 | McCord | ............... | G02B 6/4459 |
| | | | | | | 174/481 |
| 6,522,823 | B1 | | 2/2003 | Wentworth et al. | | |
| 6,586,680 | B1 | | 7/2003 | Nelson | | |
| 6,972,368 | B2 | * | 12/2005 | VanderVelde | .......... | A47B 21/06 |
| | | | | | | 174/135 |
| 7,184,644 | B2 | | 2/2007 | Johnson et al. | | |
| 7,470,859 | B1 | | 12/2008 | Gretz | | |
| 7,544,900 | B2 | * | 6/2009 | Makwinski | .......... | H02G 3/0431 |
| | | | | | | 174/480 |
| 7,601,922 | B2 | | 10/2009 | Larsen et al. | | |
| 7,693,386 | B2 | * | 4/2010 | Waszak | ................ | G02B 6/4459 |
| | | | | | | 211/26 |
| 7,826,707 | B2 | * | 11/2010 | Cassidy | ............... | G02B 6/4455 |
| | | | | | | 385/134 |
| 8,263,863 | B2 | * | 9/2012 | Young | .................. | H02G 3/0443 |
| | | | | | | 174/135 |
| 8,315,069 | B2 | | 11/2012 | Caveney | | |
| 8,319,120 | B2 | | 11/2012 | Caveney | | |
| 8,502,071 | B2 | | 8/2013 | Caveney et al. | | |
| 9,184,578 | B2 | * | 11/2015 | Winn | .................... | H02G 3/0443 |
| 9,466,959 | B2 | | 10/2016 | Larsen et al. | | |

(Continued)

FOREIGN PATENT DOCUMENTS

WO      2015200910      12/2015

Primary Examiner — William H. Mayo, III
Assistant Examiner — Hiram E Gonzalez
(74) Attorney, Agent, or Firm — Bryan Cave Leighton PaisnerLLP (57) ABSTRACT Crossover-bridge cable routers for routing cables through intersections and/or around corners of cable trays are described herein. The crossover-bridge cable router may include a floor, at least a portion of which is substantially horizontal, and at least two ramps, wherein each ramp extends downward from a side of the floor and is positioned either parallel or perpendicular to the other (i.e., opposing or adjacent) ramp.

18 Claims, 9 Drawing Sheets (56) References Cited

U.S. PATENT DOCUMENTS

| | | |
|---|---|---|
| 2004/0201975 A1 | 10/2004 | Bravo et al. |
| 2008/0023212 A1 | 1/2008 | Larsen et al. |
| 2010/0038496 A1 | 2/2010 | Sjoqvist |
| 2011/0286785 A1 | 11/2011 | Brouwer et al. |
| 2012/0211609 A1 | 8/2012 | Mandic |
| 2012/0223192 A1 | 9/2012 | Donaldson et al. |
| 2015/0380918 A1 | 12/2015 | Kellerman |
| 2016/0181778 A1 | 6/2016 | Kellerman |

* cited by examiner

DETAIL A
SCALE 1 : 5

CROSSOVER-BRIDGE CABLE ROUTER

CROSS-REFERENCE TO RELATED APPLICATIONS

This application claims priority to U.S. Provisional Patent Application No. 62/096,250, the content of which is incorporated herein by reference in its entirety.

FIELD OF THE DISCLOSURE

The present disclosure generally relates to accessories for cable tray systems, and more particularly to crossover-bridge cable routers for preventing contact between cables within an intersection of multiple cable trays.

BACKGROUND

Cable trays or troughs are used to support cables which run through, over, and around buildings. Cable trays may have both straight and curved, and intersecting sections (including horizontal, vertical, and/or other angled sections) to accommodate the installation requirements of particular settings.

If certain cable types come into contact with each other, electrical or other interference can result. Therefore, it is desirable to have a cable routing system that prevents or minimizes such contact.

SUMMARY OF THE DISCLOSURE

Among the various aspects of the present invention is the provision of a crossover-bridge cable router for position within a cable tray as substantially shown and described.

Briefly, therefore, one aspect of the disclosure is directed to a crossover-bridge cable router, comprising a floor, at least a portion of which is substantially horizontal, and at least two ramps, wherein each ramp extends downward from a side of the floor and is positioned either parallel or perpendicular to the other (i.e., opposing or adjacent) ramp.

Another aspect of the disclosure is directed to a crossover-bridge cable router, which further comprises a third ramp extending downward from a third side of the floor, wherein the third ramp is positioned parallel to the first ramp and perpendicular to the second ramp.

Yet another aspect of the disclosure is directed to a crossover-bridge cable router, which further comprises a fourth ramp extending downward from a fourth side of the floor, wherein the fourth ramp will run parallel to the second ramp.

Other objects and features will be in part apparent and in part pointed out hereinafter.

BRIEF DESCRIPTION OF THE DRAWINGS

These and other features, aspects and advantages of the disclosure will become more fully apparent from the following detailed description, appended claims, and accompanying drawings, wherein the drawings illustrate features in accordance with exemplary aspects of the disclosure, and wherein:

DETAILED DESCRIPTION

The accompanying Figures and this description depict and describe embodiments of a cable router in accordance with the present disclosure, and features and components thereof. It should also be noted that any references herein to front and back, right and left, top and bottom, upper and lower, and first, second, third, and fourth are intended for convenience of description, not to limit the present invention or its components to any one positional or spatial orientation.

Before any aspects of the disclosure are explained in detail, it will be understood that the disclosure is not limited in its application to the details of construction and the arrangement of components set forth in the following description or illustrated in the following drawings. The disclosure is capable of other aspects and of being practiced or of being carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. All numbers expressing measurements and so forth used in the specification and claims are to be understood as being modified in all instances by the term "about."

Various aspects of the present disclosure are directed to a crossover-bridge cable router. As noted above, crossover-bridge cable routers assist in preventing contact (including physical contact) of cables with other cables within the intersection of multiple cable trays. Accordingly, aspects of the crossover-bridge cable routers described herein are capable of routing cables in such a way as to avoid contact with other cables. For example, a first cable (or set of cables) can be routed over a second cable (or set of cables) in a cable tray via the crossover-bridge, the first cable (or set of cables) running perpendicular to the second cable (or set of cables) in a set of cable trays. By way of another example, a first cable (or set of cables) can be routed over a second cable (or set of cables) in a cable tray from a first direction to a second direction running perpendicular to the first direction (i.e., around a corner intersection of cable trays).

As understood in the art, cables made of fiber optic should not come into contact with cables made of other materials so as to avoid electromagnetic interference. Advantageously, the crossover-bridge cable router described herein facilitates the routing of fiber optic cables over other cable types (e.g., copper and aluminum cables) such that these different cable types do not come into substantial (e.g., physical or substantially proximal) contact with one another. Typically, but not necessarily, copper (and/or aluminum) cables will run along the bottom of the tray due to their weight, while fiber optic cables will run over the copper (and/or aluminum) cables by way of the crossover-bridge cable router described herein.

With reference to FIGS. 1-8, an aspect of a crossover-bridge cable router is described in detail. Crossover-bridge cable router 10, or simply cable router 10, includes a floor 12 on which cables routed up and out of cable tray will rest. At least a portion of floor 12 is substantially horizontal. Extending downward from the first side of floor 12 is a first ramp 14. At least a portion of first ramp 14 is curved along a first horizontal axis that is substantially perpendicular to the first direction and substantially parallel to the second direction. Extending downward from a second side of floor 12 is a second ramp 16. Similar to the first ramp, at least a portion of second ramp 16 is curved along a second horizontal axis that is substantially perpendicular to the first direction and substantially parallel to the second direction and the first horizontal axis.

In certain embodiments, extending downward from a third side of floor 12 can be a third ramp 18. At least a portion of third ramp 18 is curved along a third horizontal axis that is substantially parallel to the first direction and substantially perpendicular to the second direction and the first and second horizontal axes.

Figure 6A:
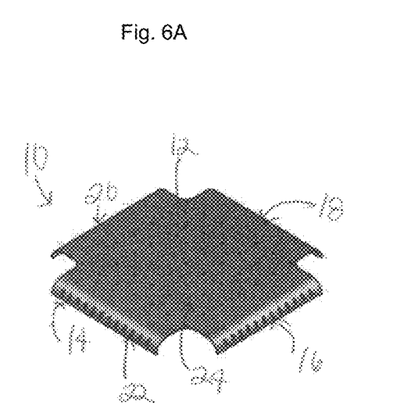
FIG. 6 is a perspective view of a cable router with four ramps of substantially equal length.
Figure 6B:
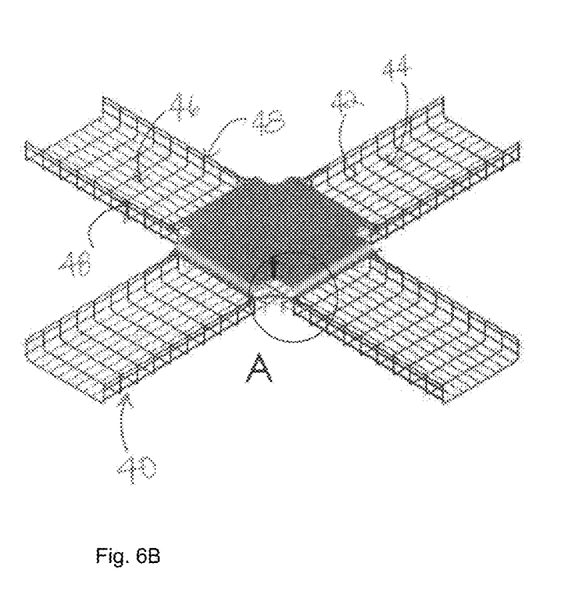
Figure 6C:
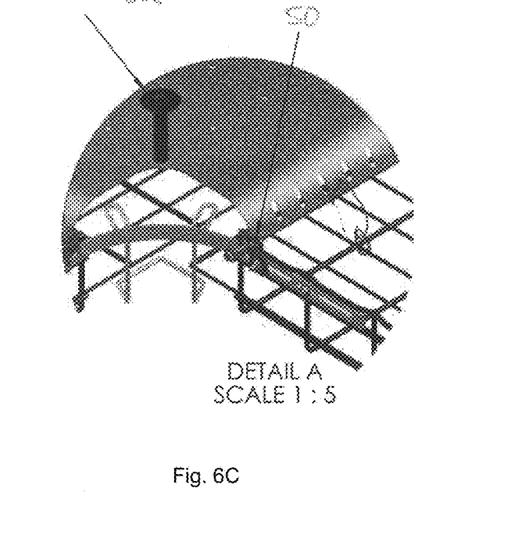
Figure 7A:
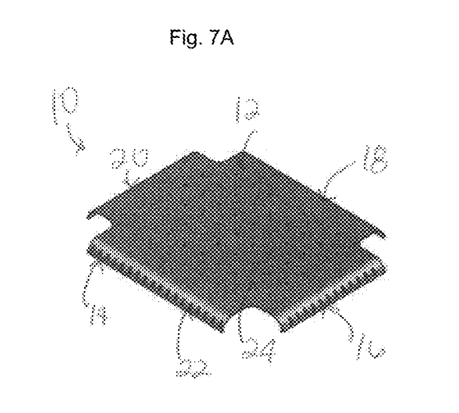
FIG. 7 is a perspective view of a cable router with four ramps, including two ramps of substantially equal lengths and two ramps of differing lengths relative to two aforementioned ramps, but of substantially the same length as each other.
Figure 7B:
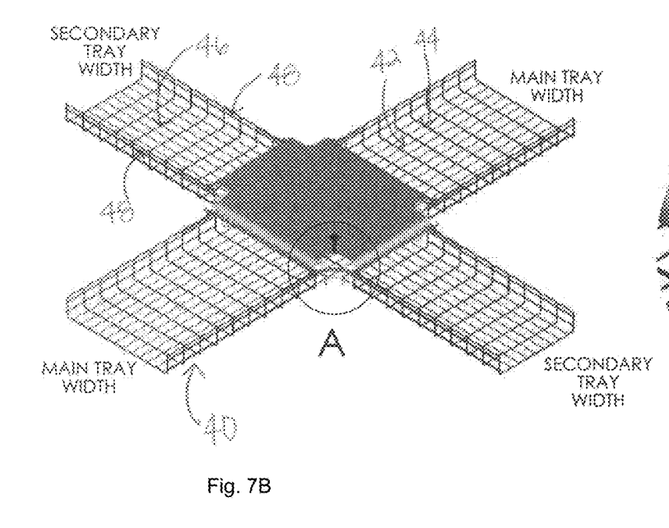
Figure 7C:
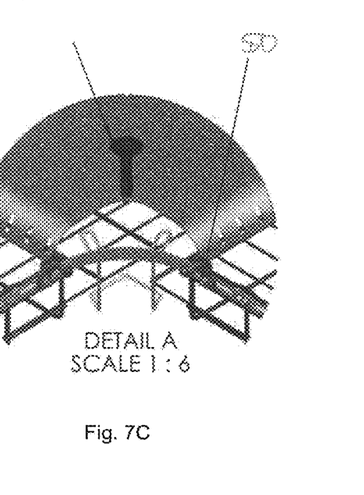

In certain embodiments, extending downward from a fourth side of floor 12 can be a fourth ramp 20. At least a portion of fourth ramp 20 is curved along a fourth horizontal axis that is substantially parallel to the first direction and substantially perpendicular to the second direction and the first and second horizontal axes.

As shown in FIGS. 1-7, first ramp 14, second ramp 16, third ramp 18, and/or fourth ramp 20 can include a population of apertures 22, such as holes or slots, extending through the ramp surface. The apertures 22 may be used to secure one or more cables to the ramp(s). For instance, zip ties, hose clamps, straps, etc. may be looped through one or more of the population of apertures 22 and around cables routed through cable router 10 to secure cables to cable router 10. Additionally, or alternatively, the bottom edges of one or more of the first, second, third, and fourth ramps are preferably hemmed. That is, the bottom edge of any or all of the ramp(s) are folded over back on themselves. Hemming the ramps creates a smooth edge on the bottom of the ramps and reduces or eliminates the potential for cables to snag on the bottom of the ramps.

Figures 8A, 8B, 8C:
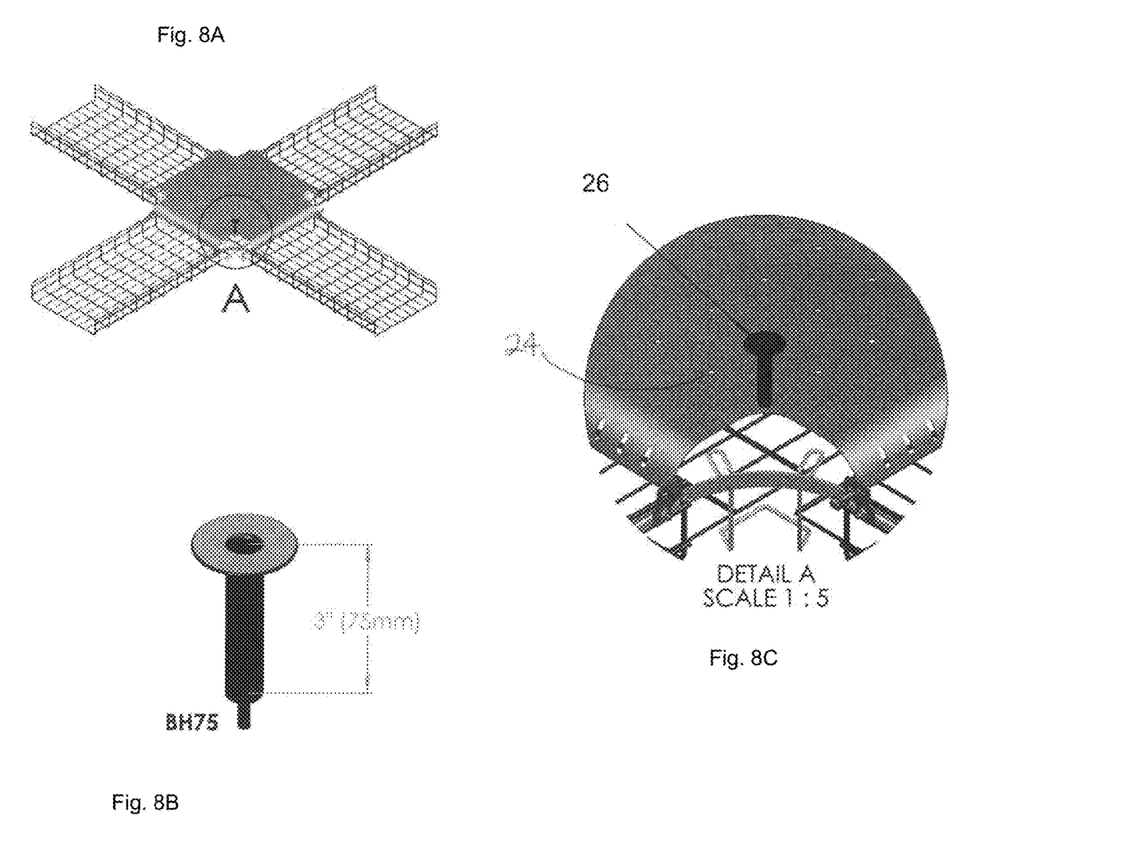
FIG. 8 is a perspective view of a cable router with a spindle inserted into an opening in the floor portion of the cable router and FIG. 9 is a perspective view of one embodiment of a clip for use with the cable router.

As shown in FIG. 8, floor 12 can, in certain embodiments, include a population of openings 24, such as holes or slots, extending through the floor, which may be used for securing the cable(s) or for receiving a spindle 26. The spindle may, in various embodiments, be used to assist in routing one or more cables in a direction substantially different from the original direction the cable or cables were running (e.g., around a corner). For example, one or more spindles 26 may be provided to ensure that the cables (e.g., fiber optic cables) are not kinked or bent at a sharp angle, as the performance, reliability and integrity of which can be negatively impacted if they are kinked or bent.

Figure 1:
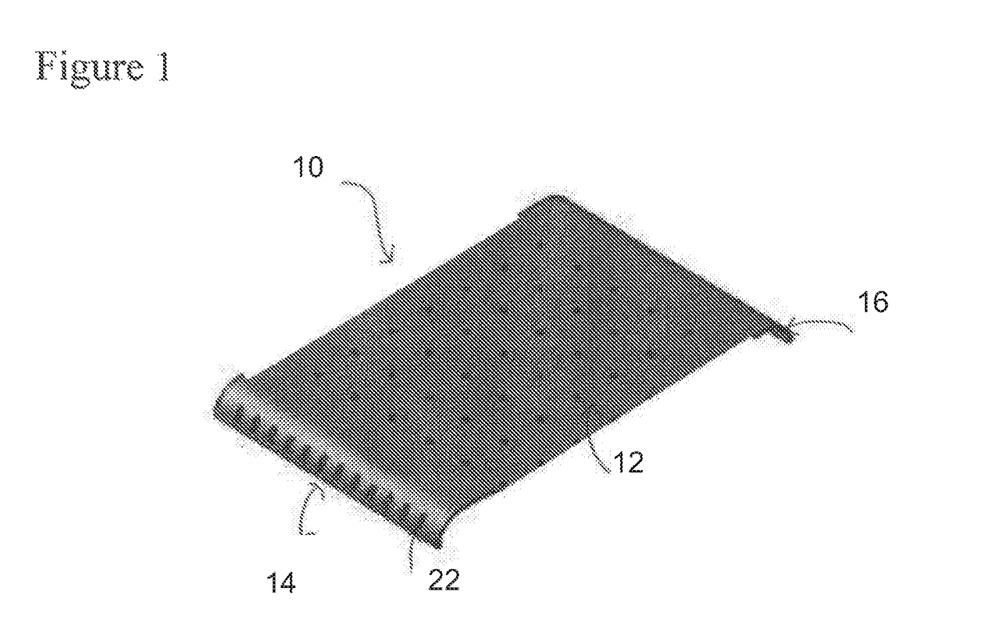
FIG. 1 is a perspective view of a cable router with two ramps of substantially equal length running parallel to each other.
Figure 2:
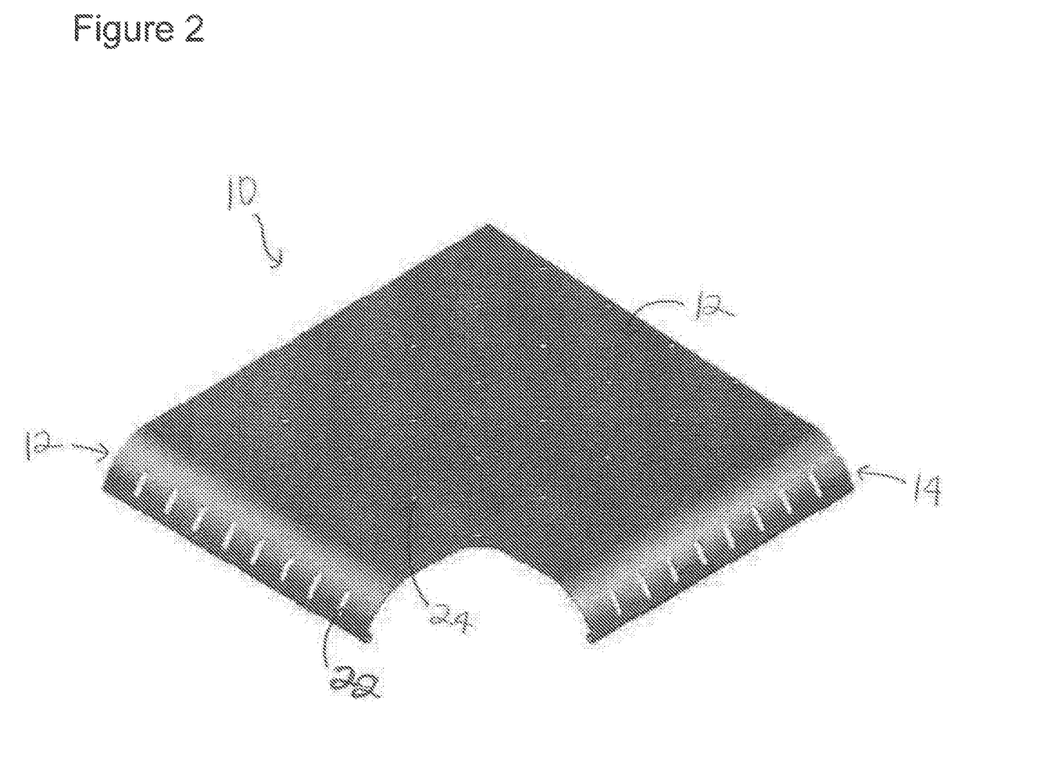
FIG. 2 is a perspective view of a cable router with two ramps of substantially equal length running perpendicular to each other.
Figure 3:
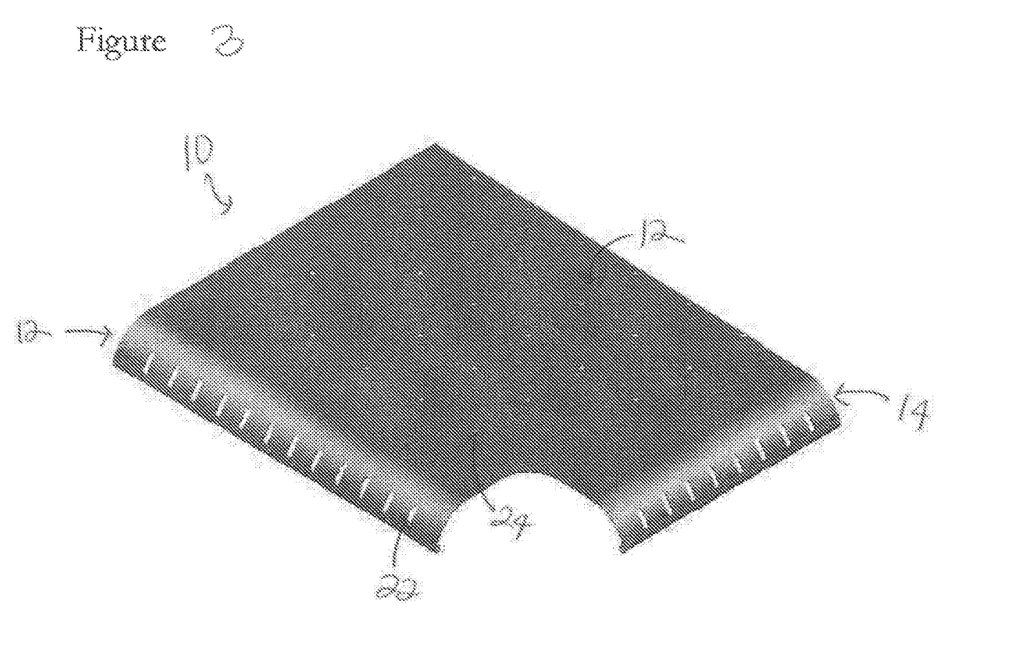
FIG. 3 is a perspective view of a cable router with two ramps of differing lengths running perpendicular to each other.

As shown in FIGS. 1-3, first ramp 14 may have a width, $W_1$, from about 100 mm to about 1000 mm (e.g., about 100 mm, about 150 mm, about 200 mm, about 250 mm, about 300 mm, about 350 mm, about 400 mm, about 450 mm, about 500 mm, about 550 mm, about 600 mm, about 650 mm, about 700 mm, about 750 mm, about 800 mm, about 850 mm, about 900 mm, about 950 mm, about 1000 mm). In some embodiments, for example, first ramp 14 has a width, $W_1$, of about 150 mm (about 6 inches). In other embodiments, for example, first ramp 14 has a width, $W_1$, of about 600 mm (about 24 inches). Second ramp 16 may have a width, $W_2$, from about 100 mm to about 1000 mm (e.g., about 100 mm, about 150 mm, about 200 mm, about 250 mm, about 300 mm, about 350 mm, about 400 mm, about 450 mm, about 500 mm, about 550 mm, about 600 mm, about 650 mm, about 700 mm, about 750 mm, about 800 mm, about 850 mm, about 900 mm, about 950 mm, about 1000 mm). In some embodiments, for example, second ramp 16 has a width, $W_2$, of about 150 mm (about 6 inches). In other embodiments, for example, second ramp 16 has a width, $W_2$, of about 600 mm (about 24 inches). In certain embodiments, the widths, $W_1$ and $W_2$, of first and second ramps 14, 16 are substantially the same (e.g., both first and second ramps are the same and have a width of about 100 mm, about 150 mm, about 200 mm, about 250 mm, about 300 mm, about 350 mm, about 400 mm, about 450 mm, about 500 mm, about 550 mm, about 600 mm, about 650 mm, about 700 mm, about 750 mm, about 800 mm, about 850 mm, about 900 mm, about 950 mm, or about 1000 mm). However, in other embodiments, the widths, $W_1$ and $W_2$, of first and second ramps 14, 16 may be different (e.g., one of the first and second ramps 14, 16 has a width of about 100 mm, about 150 mm, about 200 mm, about 250 mm, about 300 mm, about 350 mm, about 400 mm, about 450 mm, about 500 mm, about 550 mm, about 600 mm, about 650 mm, about 700 mm, about 750 mm, about 800 mm, about 850 mm, about 900 mm, about 950 mm, or about 1000 mm and the other of first and second ramps 14, 16 has a width of about 100 mm, about 150 mm, about 200 mm, about 250 mm, about 300 mm, about 350 mm, about 400 mm, about 450 mm, about 500 mm, about 550 mm, about 600 mm, about 650 mm, about 700 mm, about 750 mm, about 800 mm, about 850 mm, about 900 mm, about 950 mm, or about 1000 mm, provided the first and second widths are different).

Figure 4A:
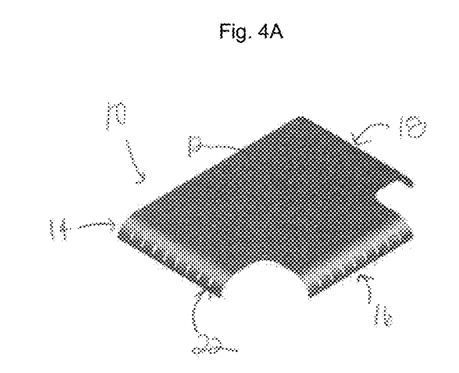
FIG. 4 is a perspective view of a cable router with three ramps of substantially equal length.
Figure 4B:
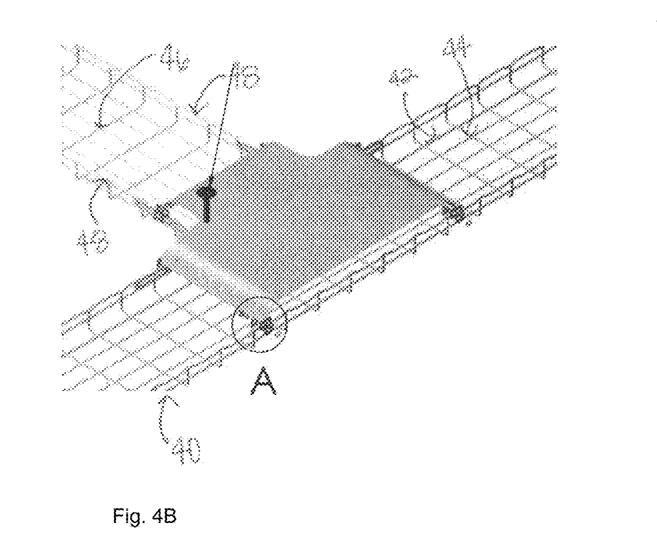
Figure 4C:
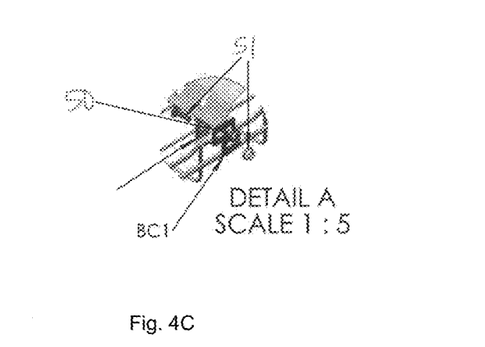
Figure 5A:
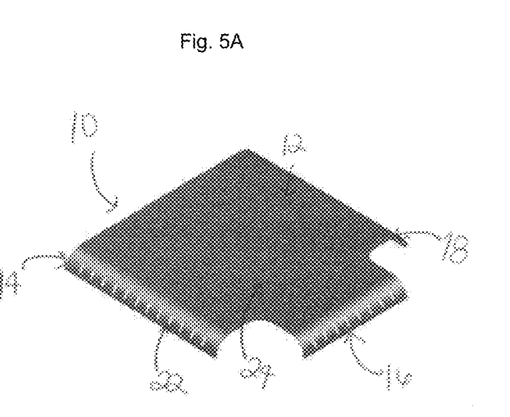
FIG. 5 is a perspective view of a cable router with three ramps, including two ramps of substantially equal lengths and one ramp of a differing length relative to the other two ramps.
Figure 5B:
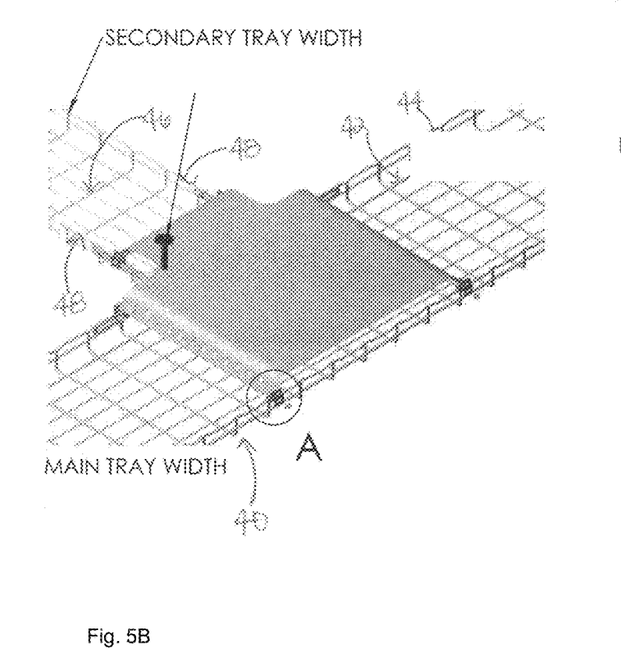
Figure 5C:
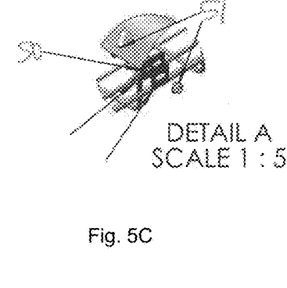

As shown in FIGS. 4 and 5, third ramp 18 may have a width, $W_3$, from about 100 mm to about 1000 mm (e.g., about 100 mm, about 150 mm, about 200 mm, about 250 mm, about 300 mm, about 350 mm, about 400 mm, about 450 mm, about 500 mm, about 550 mm, about 600 mm, about 650 mm, about 700 mm, about 750 mm, about 800 mm, about 850 mm, about 900 mm, about 950 mm, about 1000 mm). In some embodiments, for example, third ramp 18 has a width, $W_3$, of about 150 mm (about 6 inches). In other embodiments, for example, third ramp 18 has a width, $W_3$, of about 600 mm (about 24 inches). In certain embodiments, the widths, $W_1$, $W_2$, $W_3$, of first, second, and third ramps 14, 16, 18 are substantially the same (e.g., both first, second, and third ramps are the same and have a width of about 100 mm, about 150 mm, about 200 mm, about 250 mm, about 300 mm, about 350 mm, about 400 mm, about 450 mm, about 500 mm, about 550 mm, about 600 mm, about 650 mm, about 700 mm, about 750 mm, about 800 mm, about 850 mm, about 900 mm, about 950 mm, or about 1000 mm). However, in other embodiments, at least one of the widths, $W_1$, $W_2$, and $W_3$, of the first, second, and third ramps may be different from the other two ramps (e.g., one of the first, second, and third ramps 14, 16, 18 has a width of about 100 mm, about 150 mm, about 200 mm, about 250 mm, about 300 mm, about 350 mm, about 400 mm, about 450 mm, about 500 mm, about 550 mm, about 600 mm, about 650 mm, about 700 mm, about 750 mm, about 800 mm, about 850 mm, about 900 mm, about 950 mm, or about 1000 mm and at least one other of the first, second, and third ramps 14, 16, 18 has a width of about 100 mm, about 150 mm, about 200 mm, about 250 mm, about 300 mm, about 350 mm, about 400 mm, about 450 mm, about 500 mm, about 550 mm, about 600 mm, about 650 mm, about 700 mm, about 750 mm, about 800 mm, about 850 mm, about 900 mm, about 950 mm, or about 1000 mm, provided that at least one of the first, second, and third ramp widths are different).

As shown in FIGS. 6 and 7, fourth ramp 20 may have a width, $W_4$, from about 100 mm to about 1000 mm (e.g., about 100 mm, about 150 mm, about 200 mm, about 250 mm, about 300 mm, about 350 mm, about 400 mm, about 450 mm, about 500 mm, about 550 mm, about 600 mm, about 650 mm, about 700 mm, about 750 mm, about 800 mm, about 850 mm, about 900 mm, about 950 mm, about 1000 mm). In certain embodiments, for example, fourth ramp 20 has a width, $W_4$, of about 150 mm (about 6 inches). In other embodiments, for example, fourth ramp 20 has a width, $W_3$, of about 600 mm (about 24 inches). In certain embodiments, the widths, $W_1$, $W_2$, $W_3$, $W_4$ of first, second, third and fourth ramps 14, 16, 18, 20 are substantially the same (e.g., both first, second, third, and fourth ramps are the same and have a width of about 100 mm, about 150 mm, about 200 mm, about 250 mm, about 300 mm, about 350 mm, about 400 mm, about 450 mm, about 500 mm, about 550 mm, about 600 mm, about 650 mm, about 700 mm, about 750 mm, about 800 mm, about 850 mm, about 900 mm, about 950 mm, or about 1000 mm). However, in other aspects, the widths, $W_1$ and $W_3$, of first and third ramps 14, 18 may be the same while the width, $W_2$ and $W_4$, of second and fourth ramp 16, 20 may be different.

Cable router 10 is preferably constructed of steel or an alloy thereof; however, it will be understood that any type of suitable metal, or plastic, may be used, including, but not limited to, steel, stainless steel, aluminum or alloys thereof. First, second, third, and fourth ramps 14, 16, 18, 20 and floor 12 and are preferably formed of a single sheet of metal. In other aspects, cable router 10 may be constructed in a single or multiple pieces of suitable plastics.

Cable router 10 preferably further comprises reinforcing ribs (not shown), wherein the material used for construction of the cable router 10 is stamped on the floor 12 to cause portions of the floor 12 to extend in a different plane than the rest of the floor 12. These reinforcing ribs provide strength for the cable router 10 to help prevent sagging under the weight of any cables positioned along the top of cable router 10.

Referring now to FIGS. 4-7, cable router 10 is shown installed on or affixed to cable tray 40. Cable tray 40 is a conventional basket-type cable tray comprising a lattice of longitudinal and transverse wires 42, 44 secured to one another. Although cable tray 40 is shown as a basket-style cable tray, it will be understood that cable router 10 may be installed on other types and/or construction of cable trays known to those of skill in the art. Cable tray 40 is substantially U-shaped having a bottom portion 46 and two sidewalls 48 extending upward substantially perpendicular to bottom portion 46. Additionally, cable tray 40 comprises a divider (not shown) secured in the substantial middle of the bottom portion 46. When cable router 10 is installed on cable tray 40, the first direction is parallel to longitudinal wires 42 and the second direction is parallel to transverse wires 44. Furthermore, when cable router 10 is installed on cable tray 40, floor 12 is at a height at, near, or above the top of sidewall 48 and first, second, third and/or fourth ramps 14, 16, 18, 20 extend downward from above the top of sidewall 48 to below the top of sidewall 48. First, second, third, and/or fourth ramps 14, 16, 18, 20 can reside between side walls 48, 48 above bottom portion 46. At least a portion of first, second, third, and/or fourth ramps may also rest on the upper edges of sidewalls 48, 48, wherein the outer edges of the cable router 10 extend past the sidewall 48 of the cable tray 40. Thus, cable router 10 can be said to straddle sidewall 48 wherein portions of cable router 10 are above the top of sidewall 48 and portions of cable router 10 are below the top of sidewall 48 and portions of cable router 10 are between sidewalls 48, 48 and portions of cable router 10 are outside of sidewalls 48, 48. Because cable router 10 straddles cable tray 40, cable tray 40 does not need to be cut or modified for cable router 10 to be installed. By not requiring any cuts or modifications to the cable tray, the structural integrity of cable tray 40 is maintained with the use of cable router 10.

In certain embodiments, cable router 10 is substantially T-shaped (see FIGS. 4-5). Cables typically run along a first direction in cable tray 40, wherein the first direction is parallel to longitudinal wires 42. If certain cables are desired to go around the corner of cable tray 40, those cables can be run up and onto first and/or third ramps 14, 18 and will rest on floor 12 including substantially horizontal portion. Those cables will then make a substantially 90 degree turn and will exit cable router 10 and out and down second ramp 16 along a second direction. Accordingly, cables routed through cable router 10 will be directed from a first direction to a second direction, wherein the second direction is substantially perpendicular to the first direction. Cable router 10 also permits cables to run under floor 12 of cable router 10 and not be diverted out cable router 10. Cable router 10 does not take up significant space in cable tray 40 and therefore does not impact the routing of cables along cable tray 40.

In other embodiments, cable router 10 is substantially +-shaped (see FIGS. 6-7). Cables typically run along a first direction in cable tray 40, wherein the first direction is parallel to longitudinal wires 42. If certain cables are desired to go around the corner of cable tray 40, those cables can be run up and onto first and/or third ramps 14, 18 and will rest on floor 12 including substantially horizontal portion. Those cables will then make a substantially 90 degree turn and will exit cable router 10 and out and down second and/or fourth ramps 16, 20 along a second direction. Accordingly, cables routed through cable router 10 will be directed from a first direction to a second direction, wherein the second direction is substantially perpendicular to the first direction. Cable router 10 also permits cables to run under floor 12 of cable router 10 and not be diverted out cable router 10. Cable router 10 does not take up significant space in cable tray 40 and therefore does not impact the routing of cables along cable tray 40.

In some embodiments, when installed on cable tray 40, cable router 10 may be secured to cable tray 40 through the use of one or more fasteners. Such fasteners may include, but are not limited to, braces and/or bracket systems, clips, nuts and bolts, and the like.

In some embodiments, the cable router 10 can be secured to the tray using one or more braces. A brace (not shown) of cable router 10 is capable of resting on a longitudinal wire 42 of sidewall 48 thereby reducing or preventing cable router 10 from sagging under the weight of cables carried therein. That is, the weight of the cables in cable router 10 is transferred by the brace into the sidewall 48 preventing cable router 10 from moving downward or rotating rearward. Furthermore, one or more of a population of notches (not shown) can rest on a transverse wire 44 of sidewall 48 thereby reducing or preventing cable router 10 from moving longitudinally along cable tray 40. If present, notches may be semicircular in shape; however, it will be understood that notches may also be a variety of shapes including, but not limited to, triangular, square, hexagonal, octagonal, etc. The combination of the brace and the population of notches therein serve to lock cable router 10 in place on cable tray 40.

In these and other embodiments, the cable router 10 can be secured to the tray using one or more clips. For example, one or two or more bridge clips 50 can be used, wherein a first end of each is bolted or otherwise secured through the sidewall 48 of cable tray 40 and a second end of each is bolted or otherwise secured to the first, second, third, and/or fourth ramp 14, 16, 18, 20 of cable router 10. Typically, bolts 51 will extend through bridge clip(s) and holes in cable tray 40. It will be understood that in other embodiments, fewer than two bridge clips 50 may be used to affix cable router 10 to cable tray 40. It will also be understood that in yet other embodiments, more than two bridge clips 50 may be used to affix cable router 10 to cable tray 40, and fastened by various methods.

Figure 9:
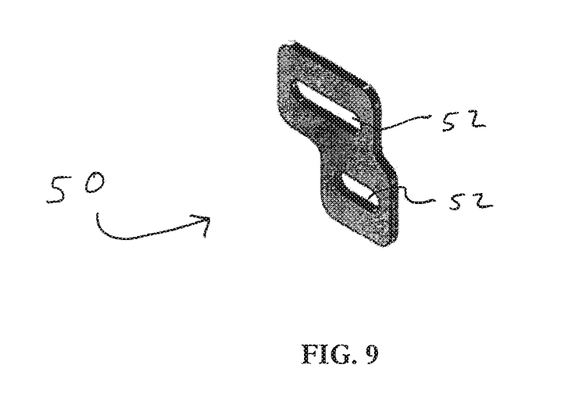
Figure 10:
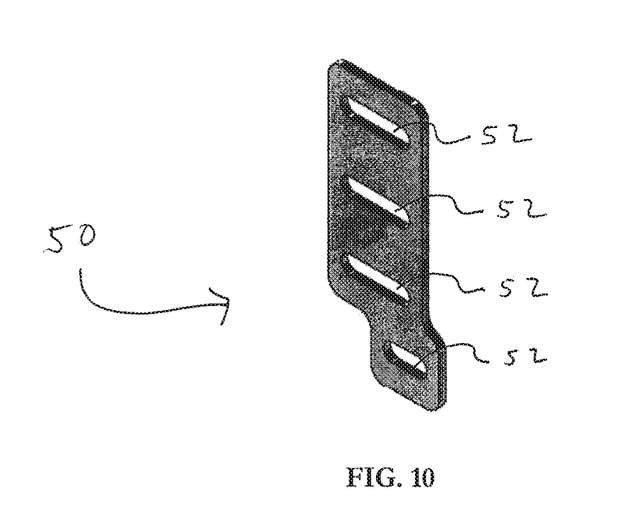
FIG. 10 is a perspective view of another embodiment of a clip for use with the cable router.

FIGS. 9 and 10 illustrate two embodiments of bridge clips 50 that may be used to secure a cable router 10 to a cable tray 40. FIG. 9 shows a clip 50 having two openings 52 to secure the router 10 at a particular height above the cable tray 40. FIG. 10 shows another version of a clip 50 having four openings 52 offering additional height placement for the router 10 to be positioned above the tray 40. Of course, clips 50 of other varying heights and any number of openings may be used depending on the application.

Additionally or alternatively, in other embodiments, bolts 51 may extend through clips (not shown) or brackets wherein clips or brackets may be used to secure or lock first, second, third, and/or fourth ramps 14, 16, 18, 20 to longitudinal and/or transverse wires 42, 44 of cable tray 40.

Having described the invention in detail, it will be apparent that modifications and variations are possible without departing the scope of the invention defined in the appended claims. Furthermore, it should be appreciated that all examples in the present disclosure are provided as non-limiting examples.

What is claimed is:

1. A crossover-bridge cable router for use in a cable tray, comprising:
    a floor, at least a portion of which is substantially horizontal;
    a first ramp extending downward from a first side of the floor, the first ramp being configured to reside above a bottom of the cable tray when the cable router is attached to the cable tray;
    a second ramp extending downward from a second side of the floor, the second ramp being configured to reside above a bottom of the cable tray when the cable router is attached to the cable tray, wherein the first and second ramps are positioned either parallel or perpendicular to each other; and
    a fastener having a first attachment structure configured to position the cable router on the cable tray such that the floor is a first distance above the bottom of the cable tray and a second attachment structure configured to position the cable router on the cable tray such that the floor is a second distance different from the first distance above the bottom of the cable tray.

2. The crossover-bridge cable router of claim 1, wherein both the first and second ramps have a downward curving portion and a vertical portion extending therefrom wherein the axis of curvature is perpendicular to the floor.

3. The crossover-bridge cable router of claim 1 further comprising a plurality of apertures extending through one or both of the first and second ramps configured to receive fasteners to secure cables to one or both of the first and second ramps.

4. The crossover-bridge cable router of claim 1 further comprising a plurality of reinforcing ribs in the floor to provide support for the router when cables are placed thereon.

5. The crossover-bridge cable router of claim 1 further comprising one or more fasteners for securing the cable router to the cable tray.

6. A method of routing cables that prevents contact between a first set of cables and a second set of cables, the method comprising routing the first set of cables over the second set of cables via the crossover-bridge cable router of claim 1.

7. The method of claim 6, wherein the first set of cables is running perpendicular to the second set of cables and is routed over the second set of cables via the crossover-bridge cable router and continues in a direction perpendicular to the second set of cables.

8. The method of claim 6, wherein the first set of cables is running parallel to the second set of cables and is routed over the second set of cables via the crossover-bridge cable router and continues in a direction parallel to the second set of cables.

9. The method of claim 6, wherein the first set of cables is running parallel to the second set of cables and is routed over the second set of cables via the crossover-bridge cable router and continues in a direction perpendicular to the second set of cables.

10. The method of claim 6, wherein the first set of cables is running perpendicular to the second set of cables and is routed over the second set of cables via the crossover-bridge cable router and continues in a direction parallel to the second set of cables.

11. The crossover-bridge cable router of claim 1, further comprising a plurality of openings extending through the floor each configured to receive a spindle for the routing of a cable or cables in a direction different from a direction of origination.

12. The crossover-bridge cable router of claim 1, wherein when the cable router is attached to the cable tray the floor is elevated above the bottom portion of the cable tray.

13. The crossover-bridge cable router of claim 1, wherein the first and second attachment structures comprise slots, the first attachment structure being vertically offset from the second attachment structure.

14. A crossover-bridge cable router for use in a cable tray comprising:
    a floor, at least a portion of which is substantially horizontal;
    a first ramp extending downward from a first side of the floor; and
    a second ramp extending downward from a second side of the floor, wherein the first and second ramps run parallel or perpendicular to each other;
    a third ramp extending downward from a third side of the floor;

a fourth ramp extending downward from a fourth side, wherein the fourth ramp runs parallel to the third ramp, wherein the first and third ramps are positioned parallel to each other, the second and fourth ramps are positioned parallel to each other, and the first and third ramps are positioned perpendicular to the second and fourth ramps; and a fastener having a first attachment structure configured to position the cable router on the cable tray such that the floor is a first distance above a bottom of the cable tray and a second attachment structure configured to position the cable router on the cable tray such that the floor is a second distance different from the first distance above the bottom of the cable tray.

15. The crossover-bridge cable router of claim 14, wherein the first, second, third and fourth ramps have a downward curving portion and a vertical portion extending therefrom wherein the axis of curvature is perpendicular to the floor.

16. The crossover-bridge cable router of claim 14 further comprising a plurality of apertures extending through one or all of the first, second, third and fourth ramps configured to receive fasteners to secure cables to one or both of the first or second ramps.

17. The crossover-bridge cable router of claim 14 further comprising a plurality of reinforcing ribs in the floor to provide support for the router when cables are placed thereon.

18. The crossover-bridge cable router of claim 14 further comprising one or more fasteners for securing the cable router to the cable tray.

* * * * *